United States Patent [19]

Wittig

[11] 4,189,647

[45] Feb. 19, 1980

[54] OPEN CYCLE OCEAN THERMAL ENERGY CONVERSION SYSTEM

[75] Inventor: J. Michael Wittig, West Goshen, Pa.

[73] Assignee: The United States of America as represented by the United States Department of Energy, Washington, D.C.

[21] Appl. No.: 934,572

[22] Filed: Aug. 17, 1978

[51] Int. Cl.² .................................................. F03G 7/04
[52] U.S. Cl. ........................................ 290/42; 290/52; 290/53; 60/641
[58] Field of Search ............... 290/42, 53, 52; 60/641, 60/651, 531

[56] References Cited

U.S. PATENT DOCUMENTS

| 4,062,189 | 12/1977 | Mager | 60/641 |
| 4,087,975 | 5/1978 | Owens | 60/641 |
| 4,142,108 | 2/1979 | Matthews | 290/52 X |

OTHER PUBLICATIONS

Bulletin de l'Institute Oceangraphique No. 906, "Study of Possibility of the Utilization of Thermal Energy of the Sea and Solar Energy", Andrew Nizery, Dec. 30, 1946.

*Primary Examiner*—B. Dobeck
*Attorney, Agent, or Firm*—J. W. Keen

[57] ABSTRACT

An improved open cycle ocean thermal energy conversion system including a flash evaporator for vaporizing relatively warm ocean surface water and an axial flow, elastic fluid turbine having a vertical shaft and axis of rotation. The warm ocean water is transmitted to the evaporator through a first prestressed concrete skirt-conduit structure circumferentially situated about the axis of rotation. The unflashed warm ocean water exits the evaporator through a second prestressed concrete skirt-conduit structure located circumferentially about and radially within the first skirt-conduit structure. The radially inner surface of the second skirt conduit structure constitutes a cylinder which functions as the turbine's outer casing and obviates the need for a conventional outer housing. The turbine includes a radially enlarged disc element attached to the shaft for supporting at least one axial row of radially directed blades through which the steam is expanded. A prestressed concrete inner casing structure of the turbine has upstream and downstream portions respectively situated upstream and downstream from the disc element. The radially outer surfaces of the inner casing portions and radially outer periphery of the axially interposed disc cooperatively form a downwardly radially inwardly tapered surface. An annular steam flowpath of increasing flow area in the downward axial direction is radially bounded by the inner and outer prestressed concrete casing structures. The inner casing portions each include a transversely situated prestressed concrete circular wall for rotatably supporting the turbine shaft and associated structure. The turbine blades are substantially radially coextensive with the steam flowpath and receive steam from the evaporator through an annular array of prestressed concrete stationary vanes which extend between the inner and outer casings to provide structural support therefor and impart a desired flow direction to the steam.

9 Claims, 10 Drawing Figures

OPEN CYCLE OCEAN THERMAL ENERGY CONVERSION SYSTEM

GOVERNMENT CONTRACT

This invention is believed to have been made or conceived in the course of, or under a contract with the United States Department of Energy identified as EG-77-03-1473.

CROSS-REFERENCE TO RELATED APPLICATIONS

This invention is related to an invention disclosed in the application of J. M. Wittig, Ser. No. 934,575, filed Aug. 17, 1978, and an invention disclosed in the application of J. M. Wittig and S. J. Jennings, Ser. No. 934,574 filed Aug. 17, 1978.

BACKGROUND OF THE INVENTION

1. Field of the Invention

This invention relates to open cycle, ocean thermal energy conversion systems, and more particularly, to an axial flow turbine apparatus having an outer casing which simultaneously functions as a water carrying conduit and structural support.

2. Description of the Prior Art

Ocean thermal energy conversion is a process by which the normal temperature difference existing between relatively warm surface waters and relatively cold, subsurface waters is utilized to develop a pressure difference across a turbine through which a motive fluid is expanded. The surface of large water bodies, such as oceans, acts as a large, cheap solar energy collector. The expansion energy of the motive fluid passing through the turbine causes the turbine's rotor to spin which, in turn, drives a generator. Due to the small temperature and pressure differences typically found in ocean thermal energy conversion cycles, the efficiencies are rather low. Since, however, the cost of operation for an ocean thermal energy conversion system is substantially zero, since no fuel is consumed to produce the top cycle temperature, the primary limiting construction there is the capital cost of the equipment components. Components such as the turbine and heat exchangers must by necessity, be very large to yield reasonable net electrical power output.

Ocean thermal energy conversion systems are typically classified to be of the open and closed cycle variety in which seawater and other volatile fluids are respectively utilized for the motive fluid which is expandable through the turbine. While the cycle varieties each have certain advantages over the other, a primary disadvantage of the open cycle OTEC has been the extremely large floating platform or hull structure required to support the power generation equipment and the high cost for materials and construction thereof. Reduction in the size and cost of the large platforms required for open cycle OTEC power systems could provide a favorable advantage for such open cycles with closed cycle OTEC systems. Conventional axial flow turbines typically include horizontally disposed shafts and associated casing structures which require support foundations of substantial dimensions. Platform size reduction, however, necessitates an unconventional turbine which utilizes minimum platform space and functionally cooperates with other OTEC equipment in a spacially efficient manner.

SUMMARY OF THE INVENTION

In accordance with the present invention, an improved open cycle ocean thermal energy conversion system is provided for generating electrical power and producing distilled water. The invention generally comprises a flash evaporator having an inlet opening and a drain outlet, a skirt-conduit structure, preferably fabricated of prestressed concrete, connected to the evaporator's drain outlet and having a cylindrically shaped, radially inner surface situated about a vertical axis, an axial flow elastic fluid turbine having a vertically directed shaft which supports a circumferentially disposed disc to which radially extending blades are attached, a radially inwardly, downwardly tapered prestressed concrete inner casing structure situated radially within the skirt-conduit's inner surface to therebetween define an annular motive steam flowpath of increasing flow area in the downward axial direction, an annular row of stationary vanes preferably fabricated from prestressed concrete extending across the steam flowpath upstream from the blades for providing a desired flow direction to the motive steam passing therethrough from the evaporator to the blades, and a generator coupled to the turbine's shaft for producing electrical energy.

The inner casing structure constitutes a portion axially upstream and a portion axially downstream from the disc element each of which include a transverse wall axially adjacent the disc for rotatably supporting the turbine's shaft. Additional circular partitions preferably extend across the void on the radially inner side of the tapered inner casing structure to provide structural support therefor. The skirt-conduit structure due to its cylindrical disposition about the turbine blades provides the turbine with a prestressed concrete outer casing to integrate two functions in one structure in a spacially optimum manner.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
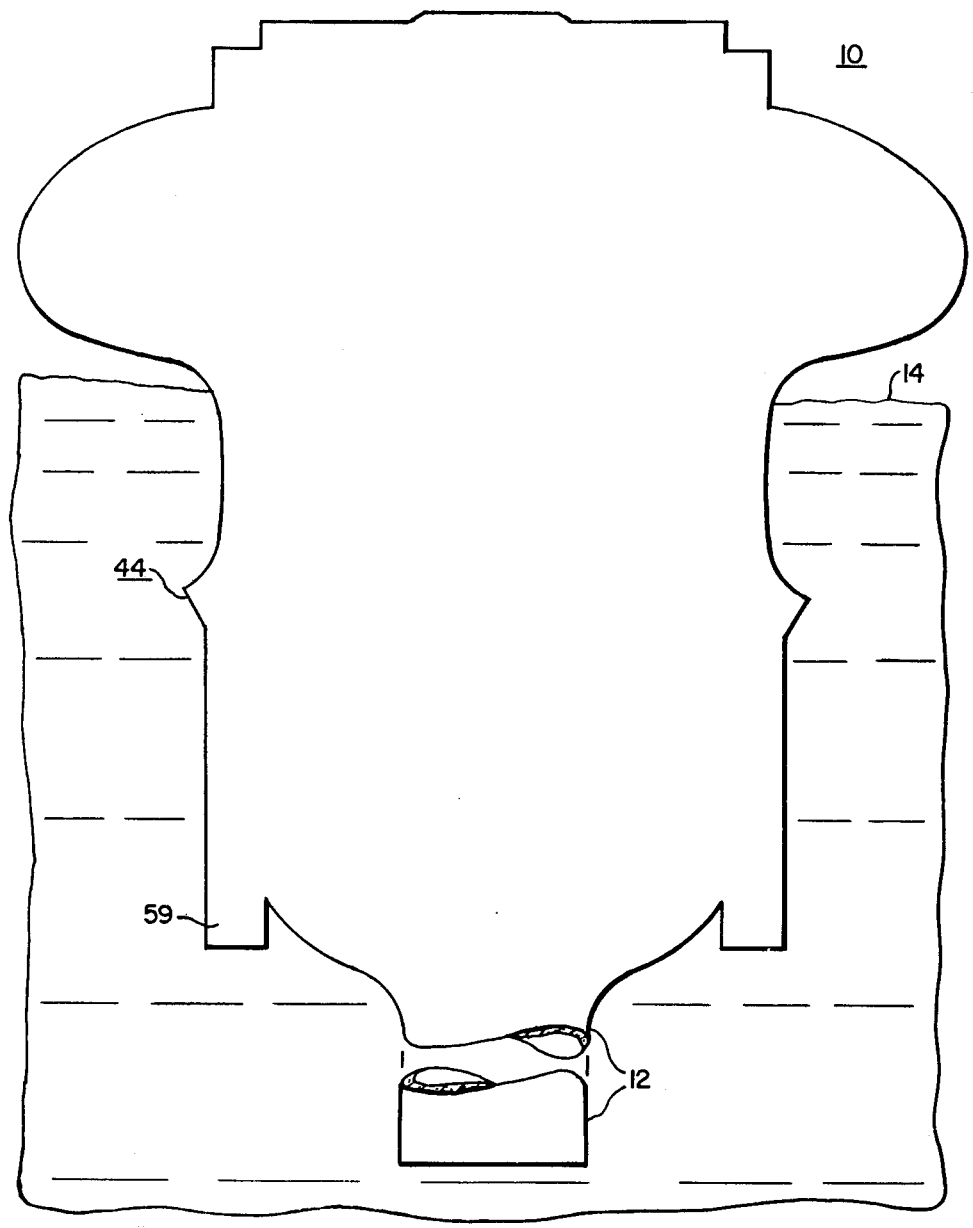
FIG. 1 is an elevation view of an open cycle OTEC system structure.

In FIG. 1 an OTEC open cycle system structure 10 is shown, disposed in operating position within a body of water such as an ocean with the illustrated representative submergence of the structure 10 within the ocean. Cold supply water conduit 12 is illustrated in a discontinuous manner since it extends approximately one thousand meters below the ocean's surface which is indicated by reference numeral 14. Cold water conduit 12 preferably constitutes prestressed concrete and rubber sections which are respectively disposed near and away from ocean surface 14. Composite conduit 12 provides a high degree of nautical stability for the generally mushroom-shaped structure 10 by penetrating to such extreme ocean depths. In the description which follows, the equipment and system structure size will pertain to an exemplary 100 megawatt net electric system. It should be understood that, however, this same system structure/packaging configuration can be utilized with different sized components or that multiple structures having the following description can, by utilizing a modular approach, be integrated into a larger overall electrical generation-water production system. Utilizing prestressed concrete for the OTEC system structure 10 enables elimination of a separate supporting platform since the prestressed concrete structure 10 simultaneously provides outer casings for the system's components and functions as a flotation device for maintaining system buoyancy within the body of water. While other materials can be utilized to form the system structure 10 and still obtain a high density power enclosure system of 3,667 cubic meters per megawatt net electric output, prestressed concrete is favored for its dual utility (containment and buoyancy) and its low material and fabrication costs.

Figure 2A:
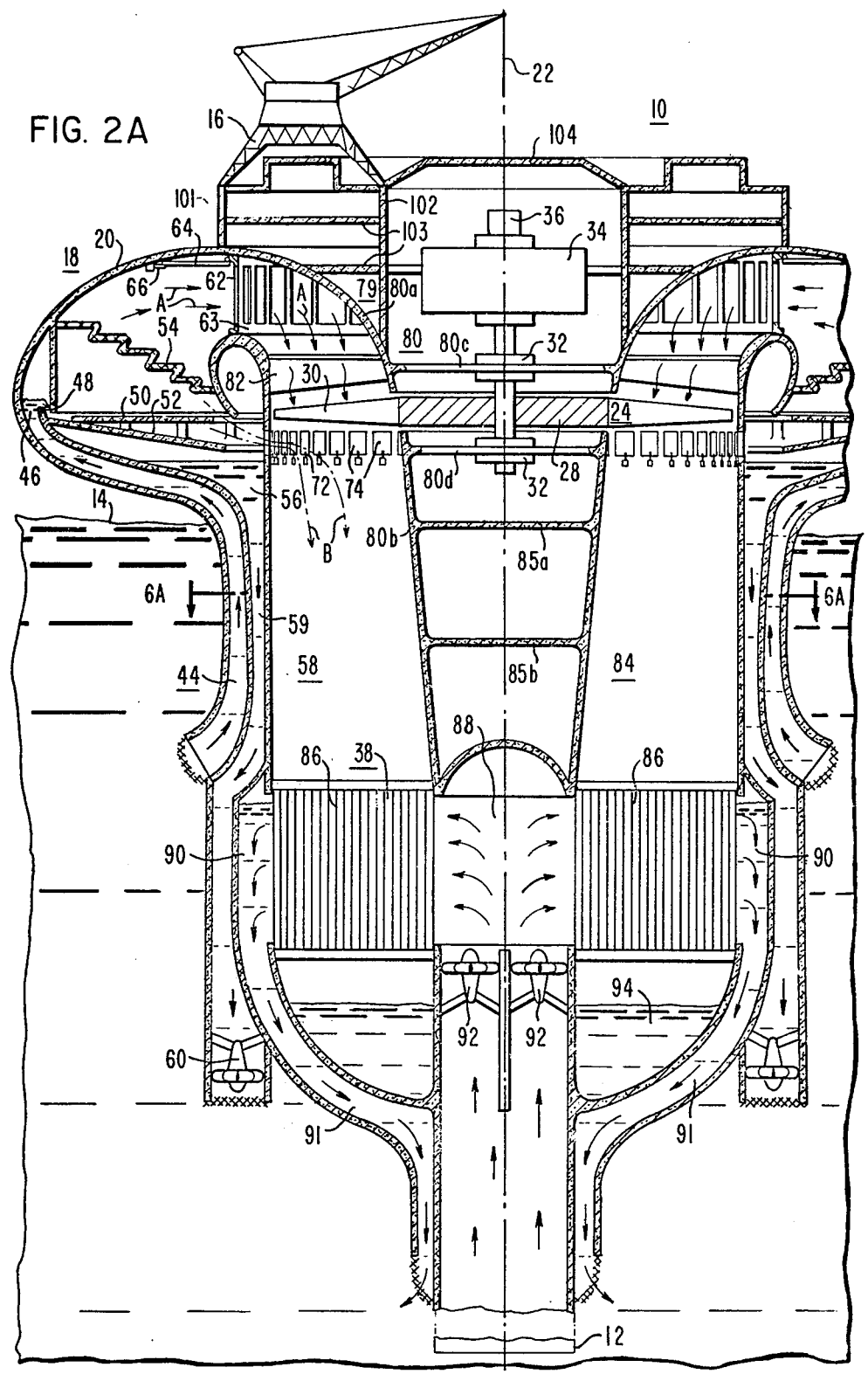
FIGS. 2A and 2B are sectional views of FIG. 1 illustrating alternate condenser tube arrangements.

FIG. 2A is a sectional view of FIG. 1. Schematic crane 16 is supported by system structure 10 and illustrates typical equipment installation and/or removal positions therefor. Flash evaporator 18 has an outer casing 20 which generally constitutes a toroidal surface. Toroidal casing 20 is radially disposed about vertical axis 22. Axial flow steam turbine 24 has a rotor structure which includes a vertical shaft 26 whose axis of rotation is substantially coincident with vertical axis 22. The rotor structure additionally includes disc portion 28 and blades 30 which preferably constitute wound fiberglass filament. Disc 28 surrounds shaft 26 and provides support for blades 30, which are attached to the radially outer periphery thereof. Disc 28 is, by example, approximately 32.7 meters in diameter and is preferably fabricated as disclosed in A. Grijalba's commonly assigned copending patent application Ser. No. 918,125. Shaft 26 is, by example, rotatably supported by exemplary 30 inch thrust bearings 32 and is coupled to drive generator 34 and exciter 36 to produce, when rotated, electrical energy. Condenser 38 is annularly disposed about vertical axis 22 and is arranged to condense motive steam exhausting from blades 30.

Figure 4:
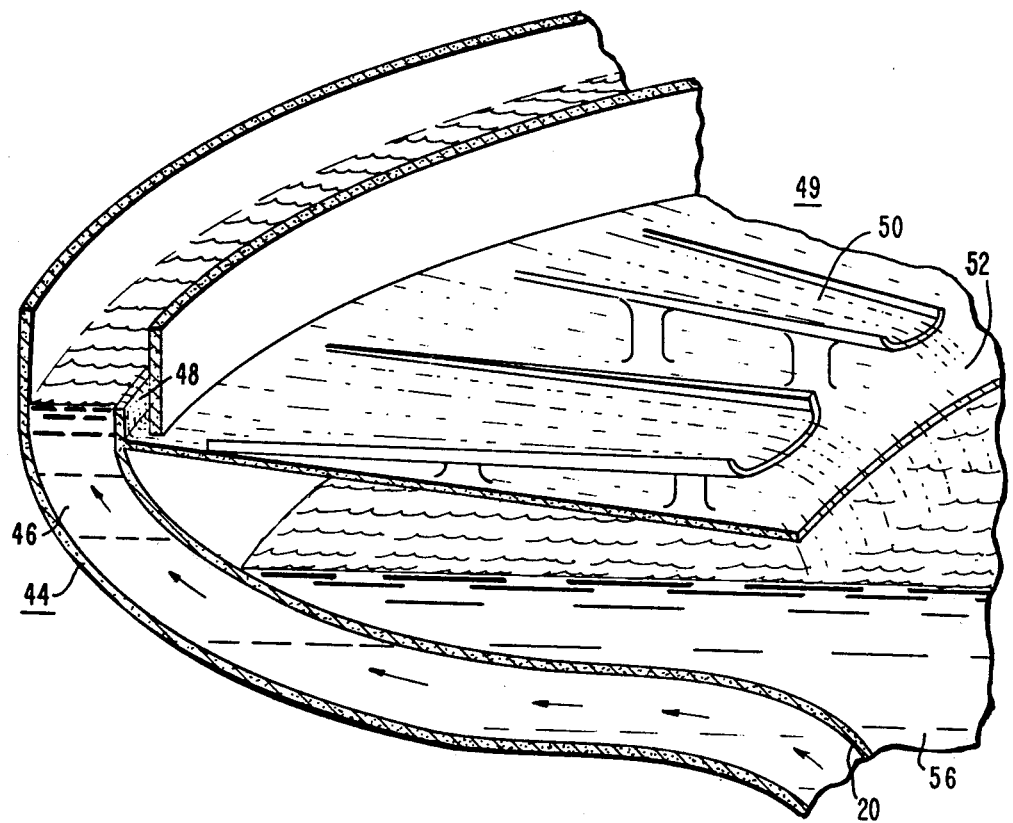
FIG. 4 is a pictorial illustration of a portion of the evaporator illustrated in FIGS. 2A and 2B.

Relatively warm ocean surface water is drawn through radially outer skirt-conduit structure 44 from a depth of approximately thirty meters through inlet opening 46 into a radially outer porton of evaporator 18's casing 20. The entering warm ocean water passes over weir 48 onto an evaporator tray structure 49 constituting two levels of evaporator trays 50 and 52, which are slightly slanted downward and radially inward. Approximately one-half to one percent of the warm ocean water passing over weir 48 flashes into steam and passes through stepped moisture separator or demister structure 54, while the remaining unflashed warm water flows radially inward and exits evaporator 18 through drain outlet 56 disposed through a radially inner portion of evaporator casing 20. Annular evaporator drain outlet 56 provides fluid access to a second skirt-conduit structure 58 which is circumferentially disposed about vertical axis 22 and includes outlet conduits 59 which transmit the warm water exiting drain outlet 56 to the ocean. FIG. 4 better illustrates outer skirt 44, weir 48, and the evaporator trays 50 and 52. Radially inward flow of the warm ocean water is imparted by weir 48 and associated evaporator tray structure 49 to minimize thermodynamic non-equilibrium and maximize steam-water separation.

At start-up time for the illustrated OTEC system, compressors evacuate evaporators 18 so as to cause relatively warm seawater to be drawn through conduits 44 and 59 into evaporator 18. Upon reaching the desired seawater level in evaporator 18 propulsion means such as pumps 60 begin to provide warm water circulation through evaporator 18. Pumps 60 are illustrated within outlet conduits 59 rather than in the inlet skirt conduits 44 to take advantage of the Barometric Level Principle in supplying minimum pumping power for the exemplary flow rate of 343 tons of water per second.

Figure 5A:
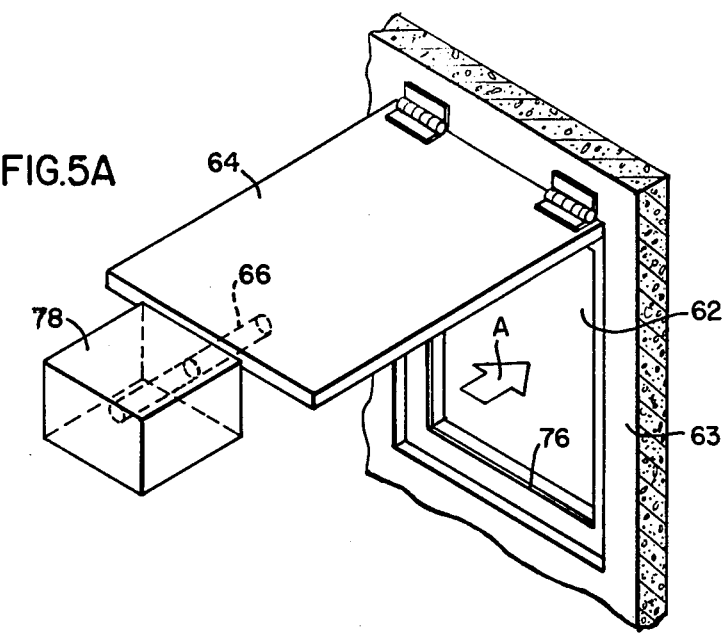
FIGS. 5A, 5B, and 5C illustrate control doors for diverting steam away to or away from the system turbine.
Figure 5B:
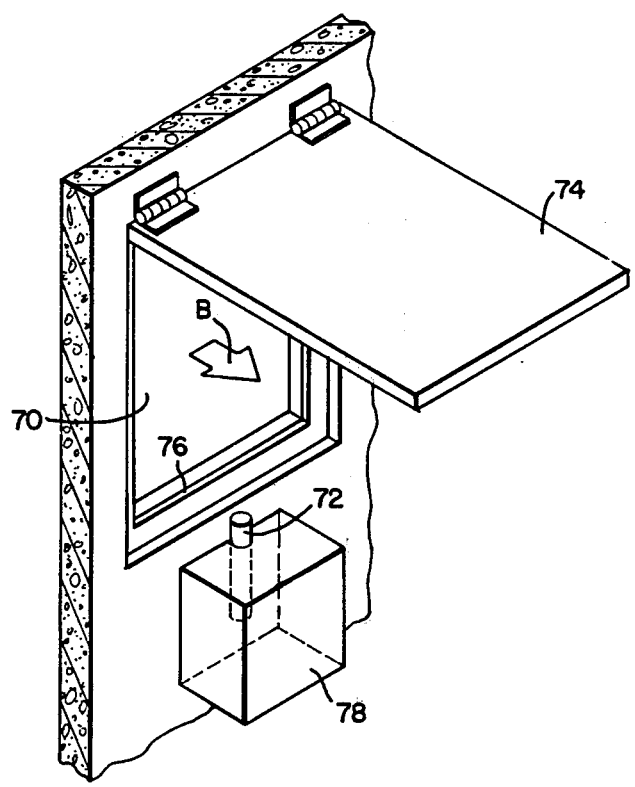
Figure 5C:
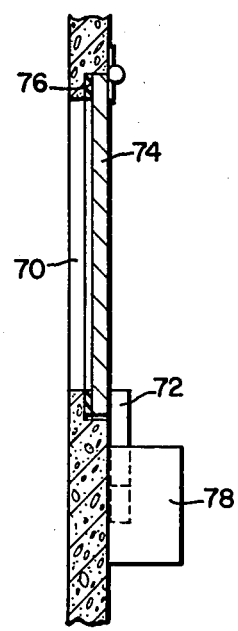

After passing through demisters 54, the steam flows in a curved path, generally radially inward, as represented by stream lines A and passes through control ports 62 in cylindrical control wall 63. Control wall 63 preferably extends between evaporator casing 20 and skirt-conduit structure 58. A plurality of such ports 62 and mateable control doors 64 are disposed circumferentially about vertical axis 22 within evaporator 18. During normal operation of the exemplary OTEC equipment, hinged control doors 64 are maintained in the illustrated, open position by extending locking pins 66 under the open doors 64 to obstruct closure thereof. When, however, a turbine overspeed or other abnormal operating condition occurs, control pins 66 are retracted, allowing control doors 64 to close and obstruct ports 62 so as to prevent motive steam from entering turbine 24. Turbine access control door 64 is better illustrated in the operating position in FIG. 5A. Control pin 66 may be actuated to the releasing position by any suitable method when one of the aforementioned abnormal conditions is detected. To avoid upsetting normal flow equilibrium between evaporator 18 and condenser 38, steam produced within evaporator 18 is bypassed to the condenser 38 around turbine 24. Bypass steam flow, under such conditions, generally follows the path indicated by stream lines B in passing through a plurality of bypass ports 70 in skirt-conduit 58. Retraction of control pins 72 allow the normal pressure differential between the evaporator and condenser to swing open hinged bypass control doors 74. Control pins 72 are preferably actuatable prior to control pins 66 to decrease the impact with which turbine access control doors 64 close. Turbine bypass control doors 74 are shown in the normal, closed operational configuration, but can be seen in the open, bypassing state in FIG. 5B. Sealing between access control doors 64 and control wall 63 and between bypass control doors 74 and the radially inner wall of skirt-conduit 58 is facilitated by interposing gaskets 76 therebetween as best illustrated in FIG. 5C. Control pins 66 and 72 are extended and retracted between obstructing and non-obstructing door positions, preferably by fast actuating means, such as electro-magnetic solenoid 78, as shown in FIGS. 5A, 5B, and 5C. During normal operation, steam following stream lines A passes into turbine inlet structure 79 through inlet ports 62 in wall 63. Skirt-conduit structure 58 provides turbine 24 with a cylindrical outer casing. A tapered inner casing structure 80 for turbine 24 includes portions 80a and 80b disposed upstream and downstream respectively of disc 28. The outer periphery of disc 28 and the base or platform of blades 30 cooperate with upstream and downstream inner casing portions 80a and 80b to provide a downwardly, radially inwardly tapered surface. The inner and outer casings therebetween define an annular motive steam flow path of increasing flow area in the downward axial direction. Turbine 24's steam inlet structure 79 receives steam from inlet ports 62 and includes radially inner wall 80a which redirects steam stream lines A from a substantially radial direction to an axial direction. Prior to entering rotatable blades 30, the motive steam passes through stationary stator vanes 82 which impart a suitable flow direction thereto compatible with entry into rotatable blades 30. After expansion through rotatable blades 30, the motive steam is exhausted through steam outlet structure 84 which includes skirt-conduit/outer casing 58 and inner casing portion 80b. Due to the diverging annular steam flow path through outlet structure 84, diffusion of the steam flow obtains resulting in a slowing of the exhausted steam and a partial conversion of its dynamic pressure into static pressure prior to its entry into condenser 38. Steam outlet structure 84 also includes inner, transverse decks, 85a and 85b which preferably house the previously mentioned evacuation compressors and other auxiliary equipment. Transverse decks 85a and 85b also provide lateral support for inner casing portion 80b since it is subjected to a vacuum on its radially outer side and substantially atmospheric pressure on its radially inner side. Inner casing portions 80a and 80b respectively include substantially circular walls 80c and 80d which are disposed on opposite axial sides of disc 28 and house bearings 32 which rotatably support shaft 26.

Figure 2B:
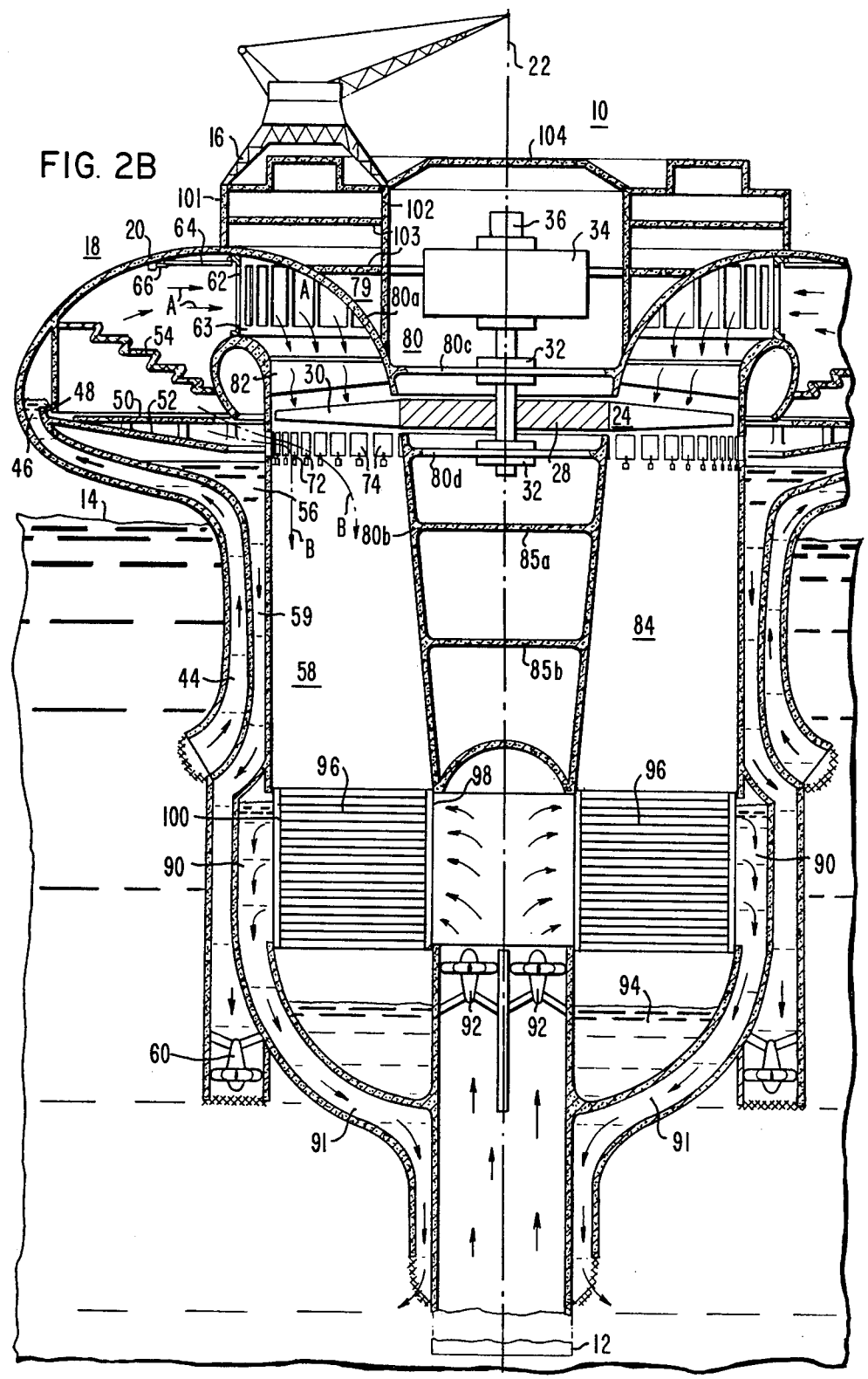

FIGS. 2A and 2B illustrate alternate embodiments for condenser 38. FIG. 2A illustrates vertical tubes 86 through which the motive steam travels and within which it is condensed by radially flowing cooling water which is segregated from the steam on the exterior of the tubes. For illustration purposes the cooling water's stream lines generally follow the paths indicated as C. The cooling water constitutes relatively cold ocean water which is drawn from depths of approximately 800 to 1,000 meters and is supplied to radially inner inlet manifold 88 through conduit 12. Cooling water flows radially outward through condenser 38 and across the exterior of tubes 86, absorbing heat and causing the motive steam to condense on the interior of tubes 86. At the radially outer edge of annular condenser 38 the heat laden cooling water passes through outlet manifold 90 into drain channel 91 both of which are included within inner skirt-conduit structure 58. The heat laden cooling water is transmitted axially downward in drain channel 91 back to the ocean by propulsion means such as pumps 92. Condensate from the motive steam drains vertically downward on the interior of tubes 86 into condensate sump 94, where it is collected for subsequent distribution.

Figure 6A:
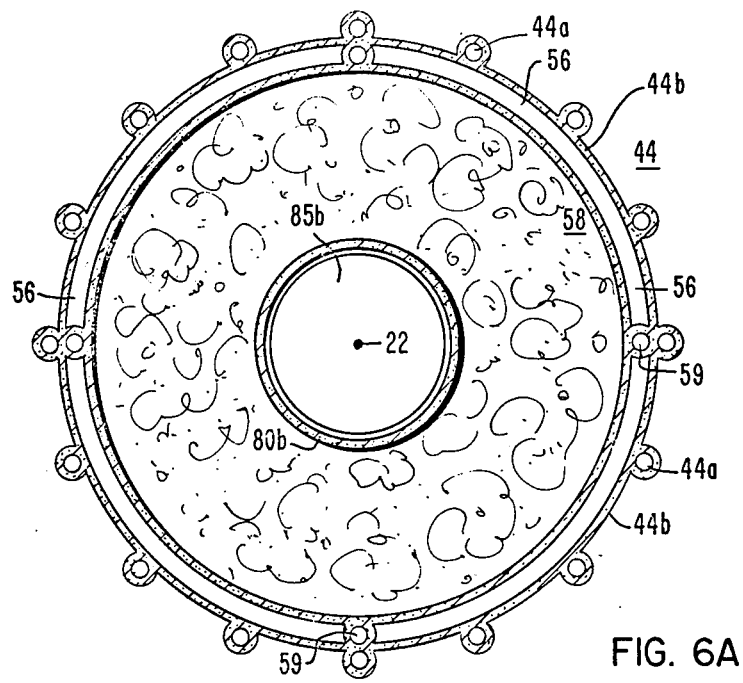
FIGS. 6A and 6B illustrate alternate plan views of an outer skirt-conduit.
Figure 6B:
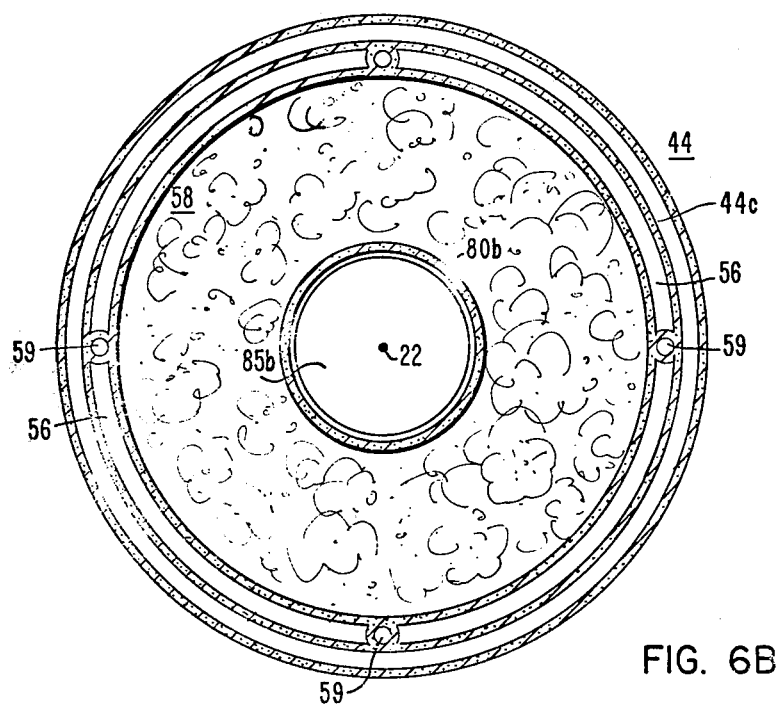

Radially outer skirt-conduit structure 44 preferably constitutes sixteen conduits 44a substantially uniformly distributed about axis 22 and a skirt member 94b which connects the included conduits. An alternate embodiment for the skirt-conduit structure includes an annular conduit 44c which also extends circumferentially about axis 22. The preferable and alternate skirt-conduit structures 44 are respectively illustrated in FIGS. 6A and 6B which are partial sectional views of FIG. 2A. Evaporator drain outlet 56 constitutes an annular channel which feeds, by example, four evaporator outlet conduits 59. Condenser drain channel 91, best shown in FIGS. 2A and 2B, preferably constitutes an annular passageway comprising part of the skirt-conduit structure 58 and is circumferentially disposed about axis 22 radially within evaporator drain outlet conduits 59. The radially inner wall of skirt-conduit 59 is seen to provide the radially outer casing of turbine 24.

FIG. 2B illustrates condenser 38 as having horizontal tubes 96, which extend through radially inner tube sheets 98 and radially outer tube sheets 100. In such configuration cooling water retains the flow pattern indicated in FIG. 2A by stream lines C, but now passes through the interior of tubes 96, causing motive steam exhausted into condenser 38 to be condensed on the exterior of tubes 96. The resulting condensate drains into annular sump 94 in a similar manner to the embodiment of FIG. 2A.

Figure 3:
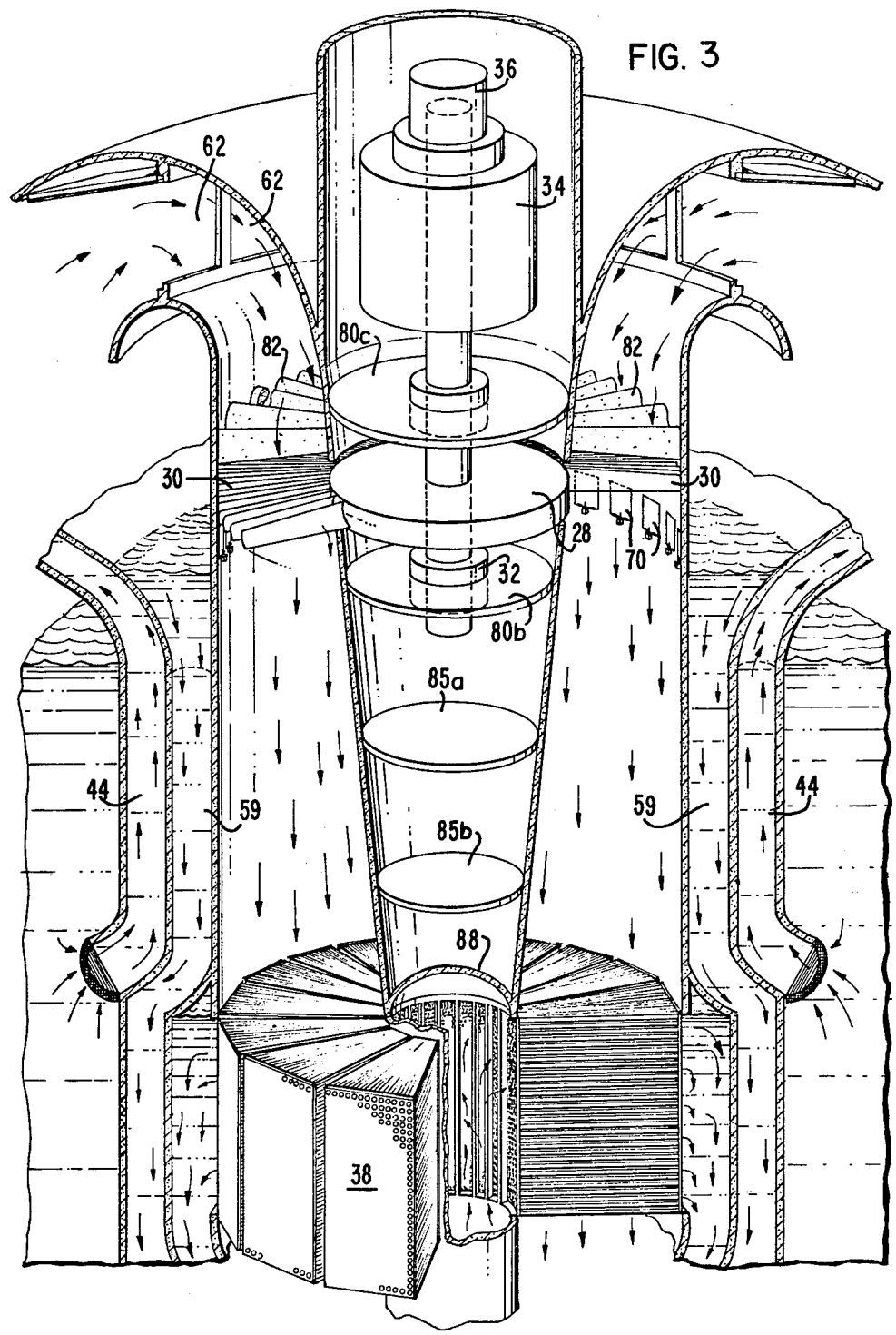
FIG. 3 is a cutaway pictorial illustration of the system shown sectioned in FIG. 2B.

FIG. 3 is a pictorial cutaway illustration of an inner portion of the system structure shown in FIG. 2B. The bypass control doors 74 illustrated in FIG. 3 are hinged along their bottom rather than their top as shown in FIG. 5B. Both bypass control door embodiments are functionally acceptable to accomplish proper transmission of bypass steam flow.

System structure 10 generally has a toroidal portion near its top and a cylindrical portion extending down therefrom so as to compositely resemble a mushroom. The toroidal evaporator casing 20 and generally cylindrical skirt-conduit/turbine casing 58 were chosen and assembled to provide a composite structural shape which is a compromise between conventionally constructed equipment casings and the vessel of minimum wall thickness—a sphere. Vertical, cylindrical bulkheads 101 and 102 are radially separated and circumferentially disposed about axis 22 above toroidal casing 20 and turbine inlet structure 79. Annular decks 103 are horizontally disposed between the bulkheads to provide rooms for housing the OTEC structure's crew and equipment control facilities. Access cover 104 disposed across the circular space bounded by bulkhead 102 can be removed by crane 16 to facilitate repair and/or maintenance of equipment components such as turbine 24, generator 34, and exciter 36. A judicious material choice for the complexly shaped system structure 10 such as prestressed concrete permits elimination of the conventional ship, hull or platform which was heretofore considered an expensive component of the open cycle OTEC system.

It will now be apparent that an improved OTEC open cycle power system has been provided in which the power cycle's component equipment casings structurally cooperate to simultaneously function as a hull structure. The equipment casing's structural and functional cooperation has reduced total plant capital cost for the exemplary 100 MWE system to $1500 per net KW electrical output. While the illustrated system is described as producing net electrical output and distilled water as a valuable byproduct, it is to be understood that component equipment size can be reduced to provide zero net electrical output if water production alone is to be economically maximized for a given system structure.

I claim:
1. An open cycle ocean thermal energy conversion system comprising:
   a flash evaporator having a casing with an inlet opening and a drain outlet therein, relatively warm ocean water being receivable through said inlet opening, said water being partially flashed into motive steam inside the casing and the remaining, unflashed water exiting the casing through the outlet drain;

a skirt-conduit structure providing fluid communication between said outlet drain and the ocean, said skirt-conduit structure being disposed about a vertically extending axis and having a cylindrically shaped, radially inner surface; and an axial flow turbine comprising a rotor structure with a vertical axis of rotation, said rotor structure including a rotatable shaft, a disc element circumferentially disposed about and connected to said shaft, and at least one axial row of radially directed blades disposed radially within said cylindrical inner surface, said blades being supported by said disc;

an inner casing structure disposed about said vertical axis; said inner casing structure cooperating with said skirt-conduit inner surface to provide an annular motive steam flowpath of increasing flow area in the downward axial direction, said turbine flowpath receiving motive steam from said evaporator, said inner casing structure having an upstream portion disposed upstream from said disc element and a downstream portion disposed downstream from said disc element, said inner casing portions' radially outer peripheries cooperating with the radially outer periphery of said disc to provide a downwardly, radially inwardly tapered surface;

an annular row of stationary vanes disposed between said inner casing structure and said skirt-conduit's inner surface across the steam flowpath upstream from said blades for imparting a predetermined flow direction to the motive steam passing therethrough;

a generator coupled to said turbine shaft for producing electrical energy.

2. The open cycle system of claim 1, each of said inner casing portions further comprising:
a transverse wall axially adjacent said disc for rotatably supporting said rotor structure.

3. The open cycle system of claim 1, said inner casing structure further comprising:
a plurality of circular partitions horizontally disposed at predetermined axial locations of the radially inner side of said tapered surface to provide structural support therefor.

4. The open cycle system of claim 1 wherein said blades are substantially radially coextensive with the annular steam flowpath.

5. The open cycle system of claim 1 wherein said upstream inner casing portion radially terminates substantially above said skirt-conduit structure.

6. The open cycle system of claim 1 wherein said evaporator casing comprises prestressed concrete.

7. The open cycle system of claim 1 wherein said skirt-conduit structure comprises prestressed concrete.

8. The open cycle system of claim 1 wherein said inner casing portions comprise prestressed concrete.

9. The open cycle system of claim 1 wherein said stationary vanes comprise prestressed concrete.

* * * * *